O. SCHLEGEL.
WIND SHIELD FOR MOTOR CYCLES.
APPLICATION FILED FEB. 7, 1916.
1,188,105.
Patented June 20, 1916.
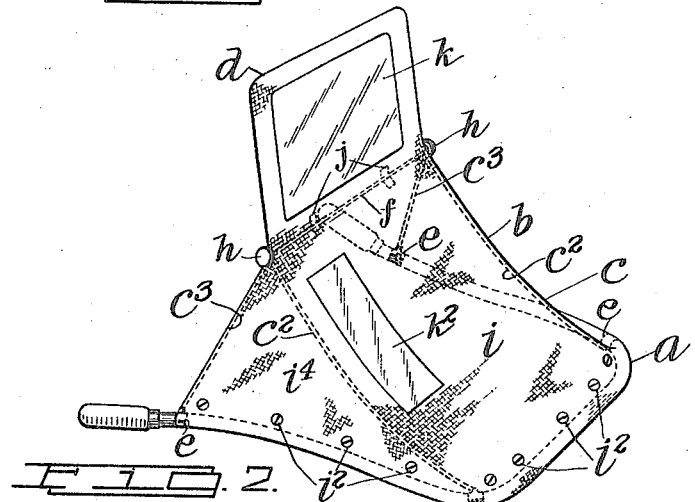
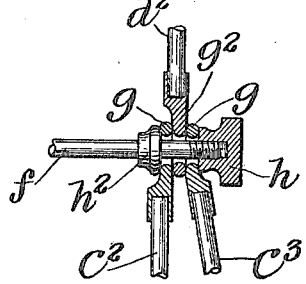
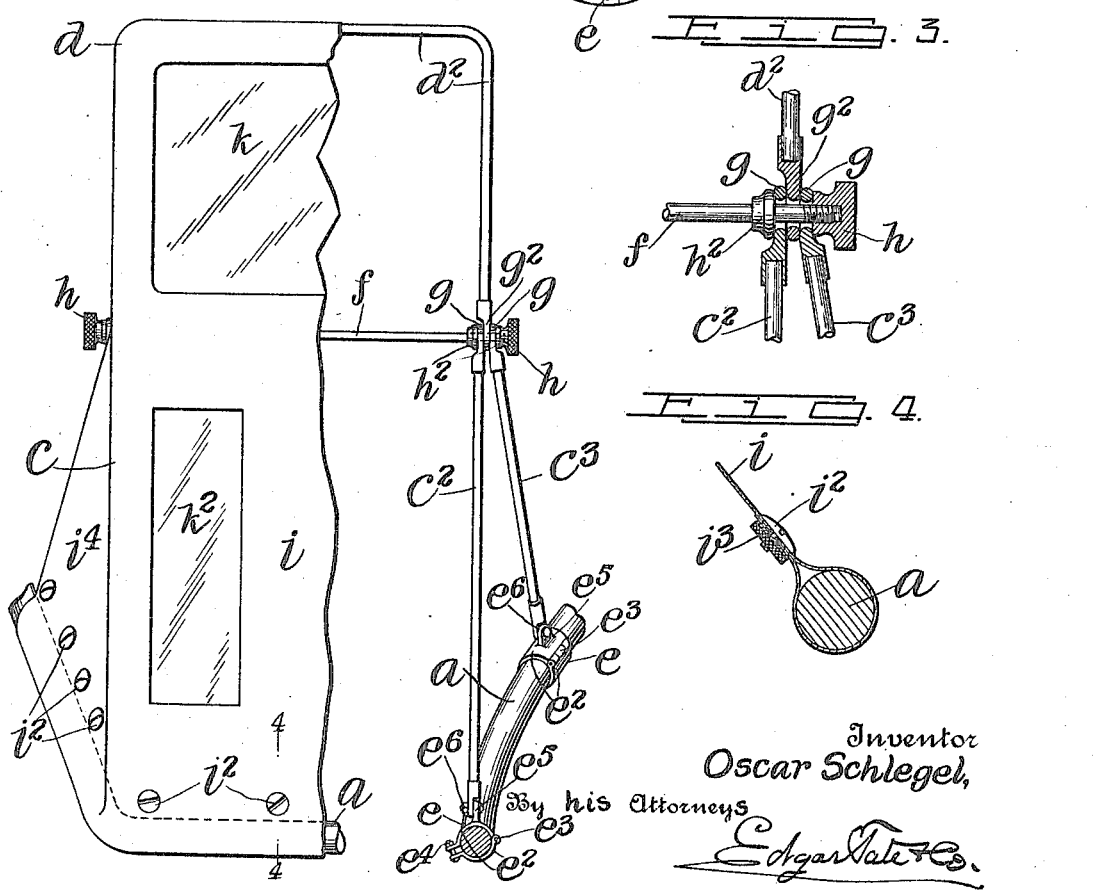
Inventor
Oscar Schlegel,
By his Attorneys

UNITED STATES PATENT OFFICE.

OSCAR SCHLEGEL, OF GREENWICH, CONNECTICUT.

WIND-SHIELD FOR MOTOR-CYCLES.

1,188,105.

Specification of Letters Patent.

Patented June 20, 1916.

Application filed February 7, 1916. Serial No. 76,541.

*To all whom it may concern:*

Be it known that I, OSCAR SCHLEGEL, a citizen of the United States, and residing at Greenwich, in the county of Fairfield and State of Connecticut, have invented certain new and useful Improvements in Wind-Shields for Motor-Cycles, of which the following is a specification, such as will enable those skilled in the art to which it appertains to make and use the same.

This invention relates to wind-shields for motorcycles, and the object thereof is to provide an improved device of this class which is adapted to be connected with the handle bar of a vehicle of the class specified and which may also be detached from said handle bar when desired and be folded compactly together for packing, shipping or other purposes.

The invention is fully disclosed in the following specification, of which the accompanying drawing forms a part, in which the separate parts of my improvement are designated by suitable reference characters in each of the views, and in which:—

Figure 1 is a perspective view of my improved wind-shield and showing it connected with the handle bar of a motorcycle; Fig. 2 a front view on an enlarged scale with part of the construction broken away; Fig. 3 a sectional view of a part of the construction shown in Fig. 2 on an enlarged scale; and, Fig. 4 a section on the line 4—4 of Fig. 2.

In the drawing forming part of this specification, I have shown at $a$ the handle bar of a motorcycle, and this handle bar is connected with the vehicle, or with the front fork post thereof in the usual or any preferred manner and, in the practice of my invention, I provide a wind-shield $b$ of the following construction:

The wind-shield $b$ comprises a suitable framework consisting of a bottom part $c$ and top part $d$, and the bottom part $c$ consists of main side rods $c^2$ and brace rods $c^3$ which are detachably connected with the handle bar at $e$ and the rods $c^2$ and $c^3$ form inverted V-shaped side frames connected at their apex by a transverse rod $f$, and the top part $d$ consists of a yoke-shaped frame $d^2$ through the ends of the sides of which the rod $f$ also passes. The rods $c^2$ and $c^3$ are connected with the handle bar $a$ by clamp members, consisting of separate parts $e^2$ hinged together at $e^3$, and said parts $e^2$ are provided with projecting jaws through which are passed a bolt $e^4$, and the top parts $e^2$ of the said clamp members are provided with ears $e^5$ to which the rods $c^2$ and $c^3$ are pivoted as shown at $e^6$. The rods $c^2$ and $c^3$ are also provided at their upper ends with heads $g$ through which the rod $f$ loosely passes, and the sides of the top frame member $d$ are provided with a similar head $g^2$ through which the rod $f$ loosely passes, and the heads $g^2$ are preferably placed between the heads $g$ of the rods $c^2$ and $c^3$, and the outer ends of the rod $f$ are provided with thumb nuts $h$, and said rod is also provided inwardly of the heads $g$ of the rods $c^2$ with rigid collars $h^2$, and the top frame member $d^2$ may be turned and adjusted into any desired position on the rod $f$, and may be secured in such position by the nuts $h$.

The entire framework of the device is provided with, or covered by a body portion $i$ of canvas or other suitable, and preferably waterproof material, and the bottom edge of said body portion is preferably folded around the handle bar $a$, as shown in Fig. 4, and secured to the body portion by means of headed pins or screws $i^2$ having thumb nuts $i^3$ and the sides $i^4$ of the body portion or covering are folded around and connected with the rods $c^3$ in any desired manner, and said covering or body portion is also connected with the rod $f$ by means of keepers $j$ secured to the back of said body portion or cover and passing around said rod.

The top of the body portion or cover $i$ which is connected with the top part $d$ of the frame of the device in any suitable manner is provided with a transparent panel $k$ of flexible material, and the bottom portion thereof is also provided with a transparent panel $k^2$ through which the operator of the machine may look, and while I have shown and described the preferred form and construction of my improved wind-shield, my invention is not limited to the details of construction herein shown and described, and changes herein and modifications thereof may be made, within the scope of the appended claims, without departing from the spirit of my invention or sacrificing its advantages.

Having fully described my invention, what I claim as new and desire to secure by Letters Patent, is:—

1. A wind-shield for motorcycles, comprising a main frame adapted to be detachably connected with the front transverse portion of the handle bar and extending upwardly and backwardly when so connected and provided at its rear upper end portion with pivoted brace members adapted to be detachably connected with the end portions of the handle bar, and a supplemental frame member pivoted to the rear top portion of the main frame member and adapted to be adjusted into different positions.

2. A wind-shield for motorcycles comprising a frame adapted to be detachably connected with the handle bar, said frame consisting of a transverse member to the opposite ends of which are pivoted brace members to the ends of which are pivoted clamping members adapted to engage the handle bar, and a yoke-shaped member pivoted to the opposite ends of said transverse member, said frame being provided with a covering which is detachably connected with the handle bar.

3. A wind-shield for motorcycles comprising a frame adapted to be detachably connected with the handle bar, said frame consisting of a transverse member to the opposite ends of which are pivoted brace members to the ends of which are pivoted clamping members adapted to engage the handle bar, and a yoke-shaped member pivoted to the opposite ends of said transverse member, said frame being provided with a covering which is detachably connected with the handle bar, said yoke-shaped member being movable into different positions, and means on said transverse member for locking said yoke-shaped and brace members against movement.

4. A wind-shield for motorcycles comprising a main frame adapted to be detachably connected with the handle bar, said frame consisting of a transverse member to the opposite ends of which are pivoted brace members to the ends of which are pivoted clamping members adapted to engage the handle bar, said frame being provided with a covering which is detachably connected with the handle bar, a supplemental frame adjustably mounted on the transverse member of the frame and provided with a covering, and means for locking the said separate members of the main frame and said supplemental frame against movement.

In testimony that I claim the foregoing as my invention I have signed my name in presence of the subscribing witnesses this 5th day of February 1916.

OSCAR SCHLEGEL.

Witnesses:
C. MULREANY,
H. E. THOMPSON.